United States Patent Office 3,055,757
Patented Sept. 25, 1962

3,055,757
STABILIZING MALT BEVERAGES
Edward Segel, Chicago, Ill., assignor to J. E. Siebel Sons' Company, Inc., Chicago, Ill., a corporation of Illinois
No Drawing. Filed Aug. 15, 1960, Ser. No. 49,450
2 Claims. (Cl. 99—48)

This invention relates to improvement in the stability of carbonated alcoholic beverages derived from malt.

More specifically, it relates to the improvement in clarity and flavor on extended storage of packaged beer, ale, and so-called "near beer," as in bottles, cans, and kegs. In the present specification, the word "beer" is used to include the entire class of carbonated fermented malt beverages.

Beer as produced in the brewery is clean, fresh, and appealing in flavor, and sparklingly brilliant in appearance. Modern techniques of brewing permit a brewer consistently to produce beer which, when fresh, conforms to rigid standards of flavor and appearance.

Once beer is packaged, it is subject to slow but inevitable deteriorative changes. The physical and chemical nature of these changes is but poorly understood. In any event, beer, after it leaves the brewery, slowly deteriorates in flavor and loses its sparkling brilliance. The rate at which these deteriorative changes take place will depend upon the conditions under which the beer is stored, such as temperature, exposure to light, vibration, and so on. Sooner or later, however, chemical changes in the beer components alter flavor of the beer while changes in colloidal stability lead to the formation of hazes and sediment.

The deteriorative changes in flavor and clarity or brilliance of beer are, of course, highly undesirable. The palate of the discriminating consumer will reject a beer which is not reasonably close to "brewery freshness." Similarly, the consumer expects and must be provided with a beer which is sparklingly brilliant.

Little is known about the causes of flavor deterioration during beer storage. It is commonly believed that oxygen accelerates some of the undesirable changes, and, accordingly, brewers strive to keep the air content in finished beer as low as possible. Sometimes various easily oxidizable substances, so-called "anti-oxidants," are added to beer during manufacture to inhibit oxidation of the beer. Beer flavor is also adversely affected by light, and breweries attempt to minimize this effect by packaging their bottled beer in colored bottles, the color being designed to exclude the harmful wave lengths of light. Elevated storage temperatures also are injurious to flavor stability, but once beer has passed out of the brewery, this variable is not controllable.

On storage of packaged beer it is also observed that, sooner or later, the originally brilliant, sparkling beverage grows hazy, either when chilled to drinking temperature, or at room temperature, or both. The exact nature of these hazes is not known. It is commonly believed by those skilled in the art that these hazes are complex in nature, and are in part composed of compounds belonging to the protein and tannin families.

Based on these considerations, various materials are used by brewers to increase the length of time during which a stored, packaged beer will remain brilliant. Most commonly, proteolytic enzymes, also known as proteases, are employed. Fermented beer is treated with enzymes such as papain, ficin, bromelin, or other enzymes having proteolytic action, or mixtures of such enzymes, and the beer is stored close to 32° F. for several days, and then packaged and pasteurized. During the period of cellar storage, pasteurization, and possibly thereafter, it is reasoned that relatively high molecular weight proteinaceous material is broken down to lower molecular sizes, and these smaller fragments are less likely to cause hazes, turbidity, and sediment.

However, it is well known that the use of such proteolytic enzymes does not eliminate the formation of hazes on storage. Reasoning that tannins as well as proteinaceous compounds cause haze, various other materials have been proposed to increase stability. These materials included tannases, enzymes which cleave or hydrolyze tannins; polyvinyl pyrrolidone, which it is claimed precipitates tannins; and nylon, which it is claimed adsorbs tannins.

Despite the use of these remedies known to the art, deterioration in the flavor and appearance of beer occurs on more or less extended storage of packaged beer so that the "shelf life" of beer is not as long as is commercially desirable.

An object of this invention is to make it possible to produce a packaged beer which will remain unchanged in flavor and clarity despite extended periods of storage.

Another object of this invention is to prevent the deterioration on storage of packaged beers, which otherwise would become unacceptable to the consumer.

As has been mentioned thereinbefore, enzymes which hydrolyze protein and enzymes which hydrolyze tannins have been employed to inhibit the formation of hazes in beer, by preventing precipitation of proteins and tannins on storage. Such proteolytic enzymes or tannases or mixtures of them have, however, only limited usefulness.

I have now found in accordance with the present invention that an entirely different enzyme, which is neither a proteolytic enzyme nor a tannase, is remarkably effective in maintaining flavor stability and in preventing haze formation in beers susceptible to such deterioration despite treatment by the other means described previously. The presence of even traces of this enzyme, chitinase, is highly effective in lengthening the useful storage life of beer. By use of this enzyme beer which would otherwise be undrinkable can be kept fresh-tasting and clear.

It is especially advantageous to use combinations of chitinase with the aforesaid proteolytic enzymes. Simultaneous use of these two completely different classes of enzymes gives stabilizing results to beer not attainable except by such combination. In this way beers of exceptional stability in storage can be prepared, impossible of preparation in any other way.

The chitinase used to practice this invention may be derived in any suitable manner, and is available from a variety of sources. The enzyme has been described in the book by M. V. Tracey, Modern Methods of Plant Analysis, vol. II, pp. 271—272 (1955) (Springer-Verlag, edited by K. Paech and M. V. Tracey) and in Chemistry and Methods of Enzymes by James B. Summer and Fred Somers, Academic Press, p. 122 (1953).

For example, chitinase can be isolated from the puffball plant (*Lycoperdon sp.*). The mature puffball is opened, and the liquid contents removed either by squeezing through cloth or by use of a small basket centrifuge. It is possible to use this extract as obtained, or purification and concentration may be effected by usual methods, such as dialysis or chromatography, as illustrated, for example, by L. Zechmeister, G. Toth, and M. Balist, Enzymologia 5, 302 (1938).

Chitinase is also extractable from other sources, such as, for example, dried almond skins.

In the practice of this invention, chitinase may be added to the beer at any suitable stage of its preparation after fermentation has been completed, preferably while the beer is in cellar storage. It is convenient and efficient to introduce chitinase into the beer at the same time the "chillproofer"—proteolytic enzymes—is aded. However, such simultaneous addition is by no means essential.

Beneficial action of chitinase on shelf life of beer can be observed even at extremely low concentrations of chitinase in beer. Thus it is useful to add even amounts as low as 0.01 gram of active chitinase enzyme to each barrel of beer. However, it is usually preferable to add larger amounts of chitinase, most generally in the range of 0.2 g. to 2 g. of active chitinase enzyme per barrel of beer. Larger amounts of chitinase are not detrimental, but become economically unsound.

Chitinase is completely without toxic effect, or indeed without any physiological effect whatsoever, on human beings.

Examples of the use of chitinase to prevent deterioration of packaged beer on storage will illustrate the utility of this invention, but in no way limit its scope.

*Example I*

Chitinase dissolved in water was added to beer at the beginning of cellar storage, after primary filtration, so that the concentration of chitinase in the finished beer was 0.4 gram for each barrel of beer. Thereafter the beer was stored, filtered, packaged, and pasteurized by procedures commonly employed in the brewing industry.

Beer so treated with chitinase was fresh in flavor and brilliant in appearance after two months' storage, whereas a beer treated similarly but without chitinase had an off-flavor and was hazy.

*Example II*

Chitinase was added to beer during cellar storage so that the concentration of chitinase in the finished beer was 0.2 gram for each barrel of beer, and a proteolytic enzyme (papain) was added at the same time so that its concentration was 1.0 grams per barrel of beer. The beer was filtered, packaged, and pasteurized by procedures commonly employed in the brewing industry.

Beer so treated with chitinase and proteolytic enzyme was fresh and brilliant in appearance after five months' storage, whereas a beer treated similarly but without chitinase had an off-flavor and had deposited sediment.

I claim:

1. The method of stabilizing carbonated alcoholic malt beverages against deterioration of flavor and clarity in storage which comprises dissolving chitinase therein after fermentation.

2. The method of stabilizing carbonated alcoholic malt beverages against deterioration of flavor and clarity in storage which comprises dissolving chitinase and protease therein after fermentation.

References Cited in the file of this patent

UNITED STATES PATENTS

| | | |
|---|---|---|
| 1,006,154 | Wahl | Oct. 17, 1911 |
| 2,912,333 | Stone et al. | Nov. 10, 1959 |